(12) United States Patent
Meckes et al.

(10) Patent No.: US 8,387,618 B2
(45) Date of Patent: Mar. 5, 2013

(54) OXYGEN EMERGENCY SUPPLY DEVICE

(75) Inventors: Rudiger Meckes, Berkenthin (DE);
Wolfgang Rittner, Siblin (DE)

(73) Assignee: B/E Aerospace Systems GmbH, Lubeck (DE)

( * ) Notice: Subject to any disclaimer, the term of this patent is extended or adjusted under 35 U.S.C. 154(b) by 1402 days.

(21) Appl. No.: 11/809,037

(22) Filed: May 31, 2007

(65) Prior Publication Data

US 2007/0283960 A1 Dec. 13, 2007

(30) Foreign Application Priority Data

May 31, 2006 (DE) .......................... 10 2006 025 263

(51) Int. Cl.
*A62B 9/02* (2006.01)
*F16K 31/02* (2006.01)

(52) U.S. Cl. .............................. 128/205.24; 128/204.22

(58) Field of Classification Search ............. 128/201.28, 128/204.18, 204.19, 204.21–204.23, 204.29, 128/205.11, 205.24, 207.16
See application file for complete search history.

(56) References Cited

U.S. PATENT DOCUMENTS

| 3,245,652 | A | | 4/1966 | Roth |
| 3,400,735 | A | * | 9/1968 | Favors et al. .................. 137/557 |
| 4,819,693 | A | * | 4/1989 | Rodder ....................... 137/625.4 |
| 5,558,086 | A | * | 9/1996 | Smith et al. ............. 128/204.26 |
| 6,990,991 | B2 | * | 1/2006 | Meckes et al. .................... 137/1 |
| 2002/0017300 | A1 | * | 2/2002 | Hickle et al. ............. 128/204.22 |
| 2002/0139370 | A1 | * | 10/2002 | Bachinski ............... 128/205.25 |
| 2005/0126571 | A1 | | 6/2005 | Jorczak et al. |

FOREIGN PATENT DOCUMENTS

| DE | 1 573 124 A1 | 10/1971 |
| FR | 2 858 560 A1 | 2/2005 |
| WO | 03/068317 A1 | 8/2003 |

* cited by examiner

*Primary Examiner* — Kristen Matter
(74) *Attorney, Agent, or Firm* — Panitch Schwarze Belisario & Nadel LLP

(57) ABSTRACT

An oxygen emergency supply device for an aircraft includes an oxygen pressure vessel, which is in fluid connection with at least one oxygen mask. Means for closing and opening the oxygen pressure vessel, means for pressure reduction, a pressure regulation device, and a flow throttle are provided in the conduit connection between the oxygen pressure vessel and the oxygen mask. The oxygen emergency supply device further includes a control device. A controllable shut-off valve forms the means for closing and opening the oxygen pressure vessel, the means for pressure reduction and a part of the pressure regulation device.

9 Claims, 2 Drawing Sheets

OXYGEN EMERGENCY SUPPLY DEVICE

BACKGROUND OF THE INVENTION

The invention relates to an oxygen emergency supply device for an aircraft.

Oxygen emergency supply systems for aircraft are known, in which oxygen stored in a pressurized gas bottle is led via a conduit connection to at least one oxygen mask. The pressurized gas bottles, which are applied with this, are closed by a shut-off valve, which may be actuated manually and downstream of which a pressure reducer is connected. A pressure regulation device is arranged in the conduit connection between the pressurized gas bottle and the oxygen mask, and subsequently downwardly regulates the oxygen pressure, reduced by the pressure reducer, to the demanded pressure required by a flow throttle connected upstream of the oxygen mask, in order to permit the required constant flow to reach the oxygen mask. The shut-off valve, the pressure reducer and the pressure regulation device, as well as the connections of these components in the conduit connection, disadvantageously represent possible locations of leakage, which necessitates examining the level of filling of the pressurized gas bottle at relatively short intervals.

Furthermore, oxygen emergency supply systems are known, in which the oxygen outlet of an oxygen container is closed with a metal membrane, which is welded on. Upon use of the system, this membrane is pierced, and thus a conduit connection is created to a pressure regulation unit with a flow throttle and to a subsequent "constant flow" oxygen mask. With this, the oxygen pressure is first reduced by a pressure reducer arranged in the conduit connection, and subsequently adapted to the pressure required at the flow throttle in front of the oxygen mask, by a pressure regulation means connected downstream of the pressure reducer. One disadvantage of such an oxygen emergency supply system is the great danger of burnout, as a result of possible rapidly oxidizing metallic breakage pieces, which may arise on piercing the metal membrane. It is also disadvantageous that the inner pressure or the degree of filling of the oxygen container may not be checked with these emergency oxygen supply systems.

BRIEF SUMMARY OF THE INVENTION

Against this background, it is an object of the invention to create a compact oxygen emergency supply device for an aircraft, which has great reliability and may be maintained in a simple manner.

The inventive oxygen emergency supply device for an aircraft comprises an oxygen pressure vessel, which is in fluid connection with at least one oxygen mask. Means for closing and opening the oxygen pressure vessel, means for pressure reduction, as well as a pressure regulation device and a flow throttle, are provided in the conduit connection between the oxygen pressure vessel and the oxygen mask. Furthermore, the oxygen emergency supply device comprises a control device. According to the invention, a controllable shut-off valve forms the means for closing and opening the oxygen container, the means for pressure reduction and a part of the pressure regulation device.

Thus, the shut-off valve not only serves for opening and closing the oxygen pressure vessel, but with a suitable activation, also assumes the task of a pressure reducer, wherein it does not relieve the oxygen pressure to an intermediate pressure, but advantageously directly to the demanded pressure needed at the flow throttle in front of the oxygen mask. Thereby, the shut-off valve also serves as a pressure regulation valve, with which the oxygen pressure may also be adapted to a desired value, which depends on the flight altitude, for example. In this manner, the invention provides for a compact and relatively light oxygen supply device, with which the number of required conduit connections and pneumatic components in the conduit connection between the oxygen pressure vessel and the oxygen mask, and thus the number of possible leakage locations, is significantly lower compared to known devices of this type. Consequently, the oxygen emergency supply device according to the invention has an improved operational reliability compared to these known devices.

The shut-off valve in the oxygen emergency supply device according to the invention is preferably arranged directly on an inlet- and outlet connection piece of the oxygen pressure vessel. The actuation of the shut-off valve is effected via the control device, which for this purpose is at least signal-connected and advantageously also conductively connected to the shut-off valve. On operation of the oxygen emergency supply device, the shut-off valve is activated by the control device to open only in short time intervals. In this manner, the oxygen pressure at the exit side of the shut-off valve may be reduced to any lower pressure level with regard to the pressure in the oxygen pressure vessel. In this manner, the shut-off valve in cooperation with the control device assumes the function of a pressure reducer, with which, given a suitable activation, it is possible to regulate (control with closed loop) the oxygen pressure directly to the demanded value required at the flow throttle in front of the oxygen mask.

For comparing the required desired pressure at the exit side of the shut-off valve to the prevailing actual pressure, a pressure sensor is usefully arranged on the exit side of the shut-off valve. This pressure sensor is signal connected to the control device. The pressure sensor detects the oxygen pressure prevailing at the exit of the shut-off valve, and transfers the pressure values in the form of electrical signals, via an electrical signal lead, to the control device. Then, on the basis of these values, the time intervals required for achieving the desired pressure and in which the shut-off valve is activated to open or close by the control device, may be determined via suitable software and/or hardware of the control device.

The control device is preferably also signal connected to an ambient pressure sensor, in order to be able to adapt the oxygen pressure which is available at the flow throttle in front of the oxygen mask, to the flight altitude or the cabin pressure. With this design, the control device on the basis of the ambient pressure values detected by the ambient pressure sensor, and the oxygen pressure prevailing at the exit side of the return valve, which is detected by the pressure sensor arranged at the exit side of the shut-of valve, may determine the opening times of the shut-off valve, which are required for achieving the demanded pressure required at the flow throttle in front of the oxygen mask. The ambient pressure sensor may be arranged, for example, in the inside of the aircraft and detect the cabin pressure, but it is also possible to arrange the ambient pressure sensor such that it records the ambient pressure outside the aircraft. Apart from this, it is of course also possible to connect the altimeter of the aircraft to the control device, and to determine the opening times of the shut-off valve on the basis of the determined altitude values.

The shut-off valve with the oxygen emergency supply device is preferably designed as an unblockable return valve. This return valve is advantageously designed such that the oxygen pressure prevailing in the oxygen pressure vessel presses a valve body against a valve seat and blocks the throughput through the valve. The self-blocking design of the return valve, in the case of a failure of the valve, advantageously prevents any unintended flow of oxygen out of the oxygen pressure vessel. Apart from this, this design permits a simple filling of the oxygen pressure vessel by way of connecting to an oxygen pressure source at the exit of the return valve. In this case, the oxygen pressure of the oxygen pressure source presses the valve body away from the valve seat, so that the oxygen may flow through the return valve into the oxygen pressure vessel. If the oxygen supply from the oxygen pressure source to the oxygen pressure vessel is interrupted, the oxygen pressure prevailing within the oxygen pressure vessel presses the sealing body again into its position against the valve seat blocking the return valve. In the case of application of the system, the return valve may be activated in a manner such that the valve body is moved within the return valve into a position releasing the valve, and the oxygen may thus flow out of the oxygen pressure vessel to the flow throttle in front of the oxygen mask.

Advantageously, the shut-off valve is controllable in an electromagnetic manner. Here, the valve comprises an electromagnet with which the actuating forces of the shut-off valve may be mustered. This electromagnet may be impinged either with direct current or with alternating current. Advantageously, this design of the valve permits very small switch times, which lie in the millisecond range. A rapid and exact pressure regulation is ensured by this.

One particularly advantageous design of the oxygen emergency supply device according to the invention envisages the valve being designed as a seat valve and preferably as a ball-seat valve. In particular, when the shut-off valve is designed as a ball-seat valve, the conduit connection from the oxygen pressure vessel to the oxygen mask may be essentially hermetically closed with the ball-like valve body. The shut-off valve is particularly preferably designed as an electromagnetically controlled ball-seat valve. Thereby, a design is provided which is particularly advantageous, wherein the oxygen pressure in the oxygen pressure vessel, in a closed position, presses a ferromagnetic, ball-like valve body against a valve seat, and an electromagnet, when subjected to current, moves the valve body out of its position blocking the throughput through the valve. The blocking of the valve is thus possible solely by switching off the electromagnet.

The shut-off valve is advantageously designed such that the opening force of the valve is directly proportional to the inner pressure of the oxygen pressure vessel. This design permits the degree of filling of the oxygen pressure vessel to be checked without oxygen getting lost from the oxygen pressure vessel. For this one may exert such an actuating force at the shut-off valve, which lies just below the actuating force which is required for the opening actuation of the shut-off valve, given a permissible minimal pressure prevailing in the oxygen pressure vessel. With this procedure, a pressure increase at the exit of the shut-off valve is an indicator that the permissible minimal pressure in the oxygen pressure vessel has not been achieved. If no pressure increase is registered at the exit of the shut-off valve, this indicates a correct filling of the oxygen pressure vessel. A particularly preferred design of the oxygen emergency supply device according to the invention envisages an electromagnetically actuated shut-off valve, which is designed in a manner such that the voltage at the electromagnet of the shut off-valve, which is required for opening the valve, is directly proportional to the inner pressure of the oxygen pressure vessel.

The shut-off valve is advantageously designed in a redundant manner and comprises two throughput paths, which are closed in each case by one valve body, for increasing the operational reliability. Alternatively, it is also envisaged to provide two parallel conduit lines in the conduit connection from the oxygen pressure vessel and flow throttle, in front of the oxygen mask, which in each case is closed by a shut-off valve. With this design, the shut-off valve may also be opened when one of the valve bodies may not be moved out of its position preventing the throughflow through the shut-off valve.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
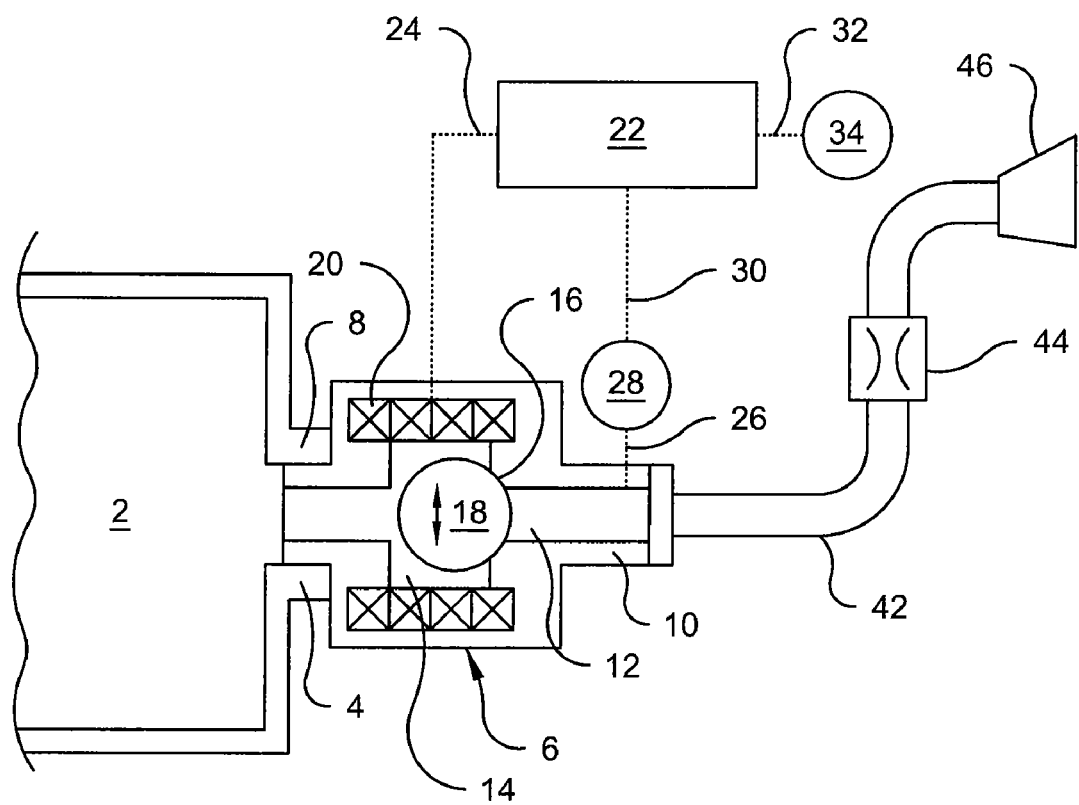
FIG. 1 is a schematic illustration of an oxygen emergency supply device for an aircraft, according to an embodiment of the invention.

An oxygen pressure vessel 2 is represented in FIG. 1. This oxygen pressure vessel 2 comprises an open inlet and outlet connection 4, to which a shut-off valve designed as a return valve 6 is connected. There, a first connection part 8 of the return valve 6 engages into the inlet and outlet connection 4 of the oxygen pressure vessel 2. A connection conduit 42 to a flow throttle 44, and ultimately to an oxygen mask 46, is connected to a second connection part 10 of the return valve 6.

The return valve 6 is designed as an electromagnetically activatable ball-seat valve. A flow path 12 runs through the return valve 6 from the first connection part 8 to the second connection part 10, wherein the cross section of the flow path 12 widens within the valve housing to a valve chamber 14. The cross-sectional transition from the valve chamber 14 to the flow path 12 is conically chamfered at the side which faces the second connection part 10. This chamfered region forms a valve seat 16 for a valve body 18 formed in a spherical shape. The peripheral surface of the valve chamber 14 is formed by an annular electromagnet 20. This electromagnet 20 serves for actuating the valve body 18 which consists of a ferromagnetic material.

Subjecting the electromagnet 20 to current is effected via an electronic control device 22, which is electrically in conductive connection with the electromagnet 20 via a conduit 24.

In the region of the second connection part 10 of the return valve 6, a pressure sensor 28 is conductively connected to the flow path 12 via a conduit 26. This pressure sensor 28 is designed in a manner such that it records the oxygen pressure prevailing in the flow path 12 in the region of the second connection part 10, and converts it into electrical signals which it transfers to an electronic control device 22 via a signal lead 30. The electronic control device 22 is signal connected to an ambient pressure sensor 34 via a further signal lead 32. This ambient pressure sensor 34 is arranged in a cabin region of the aircraft and records the pressure prevailing within the aircraft cabin.

The time intervals for opening the return valve 6 are determined by the electronic control device 22 on the basis of the pressure values detected by the pressure sensor 28 and the ambient pressure sensor 34. The electromagnet 20 is subjected to current over these time intervals. In this way, the valve body 18 is attracted by the electromagnet 20, so that it releases the flow path 12 through the return valve 6. As soon as the subjection of the electromagnet 20 to current is completed, the valve body 18 is again pressed against the valve seat 16 by the pressure prevailing in the oxygen container 2, so that the flow path 12 through the return valve 6 is blocked.

Figure 2:
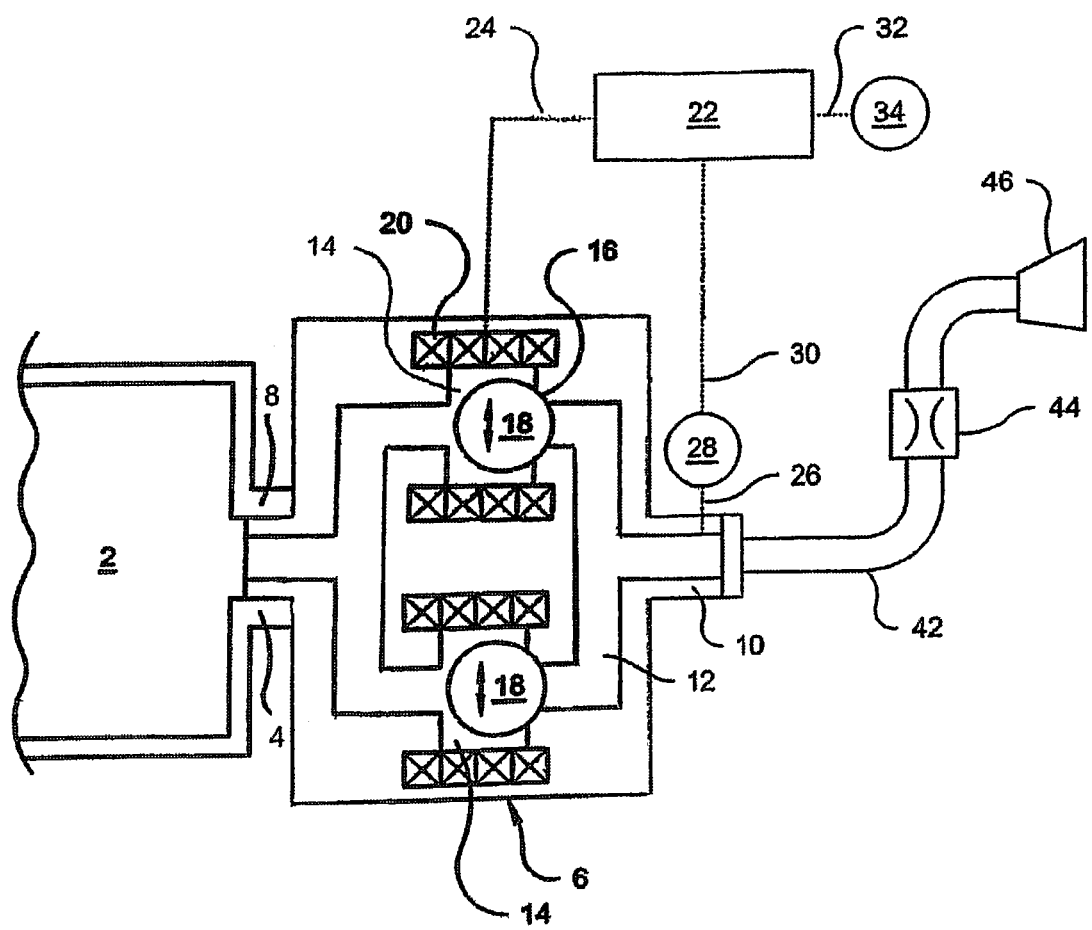
FIG. 2 is a schematic illustration of an oxygen emergency supply device for an aircraft with a redundant valve design, according to another embodiment of the invention.

FIG. 2 shows an oxygen emergency supply device for an aircraft that is similar in many aspects to the device shown in FIG. 1, and therefore the same reference numerals are used therein. The embodiment of FIG. 2 shows the return valve 6 designed in a redundant manner, wherein the flow path 12 comprises two throughput paths, each being closed by a valve body 18.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An oxygen emergency supply device for an aircraft comprising:
   a pressure vessel configured to contain oxygen under pressure;
   a shut-off valve connected at its input side to the pressure vessel and connected at its exit side to an oxygen delivery conduit in fluid communication with an oxygen mask;
   a pressure sensor which measures a pressure at the exit side of the shut-off valve; and
   a control device which receives the pressure measurement from the pressure sensor,
   wherein, in response to said pressure measurement said control device causes a voltage having alternating time intervals of on and off to be applied to said shut-off valve such that, during the on time intervals, the oxygen is allowed to flow from said pressure vessel to the oxygen delivery conduit, and during the off time intervals, the pressure prevailing in the pressure vessel causes said shut-off valve to block the flow of oxygen from said pressure vessel to the oxygen delivery conduit such that no oxygen from the pressure vessel flows to the oxygen mask, and
   wherein a magnitude of the voltage applied to said shut-off valve is directly proportional to the prevailing pressure of the pressure vessel.

2. The oxygen emergency supply device according to claim 1, wherein the control device further responds to an ambient pressure sensor.

3. The oxygen emergency supply device according to claim 1, wherein the shut-off valve has a form of an adjustable return valve.

4. The oxygen emergency supply device according to claim 1, wherein the shut-off valve is electrically controlled.

5. The oxygen emergency supply device according to claim 1, wherein the shut-off valve has a form of a seat valve.

6. The oxygen emergency supply device according to claim 5, wherein the shut-off valve has a form of a ball-seat valve.

7. The oxygen emergency supply device according to claim 1, wherein the shut-off valve has an opening force directly proportional to an inner pressure of the oxygen pressure vessel.

8. The oxygen emergency supply device according to claim 1, wherein the shut-off valve has a redundant design and comprises two throughput paths, each one of the paths being closed by a separate valve body.

9. The oxygen emergency supply device of claim 1, wherein the shut-off valve includes a ferromagnetic valve body, a valve seat and an electromagnet, and the alternating voltage is applied to the electromagnet and causes the valve body to alternately contact and separate from the valve seat.

* * * * *